Patented Nov. 25, 1952

2,619,494

UNITED STATES PATENT OFFICE 2,619,494

HYDROLYSIS OF FATS AND OILS

John Ross, Ramsey, and Walter Russell Trent, North Arlington, N. J., assignors to Colgate-Palmolive-Peet Company, Jersey City, N. J., a corporation of Delaware No Drawing. Application October 6, 1948, Serial No. 53,142

8 Claims. (Cl. 260—415)

This invention relates to improvements in fat splitting and more particularly the invention concerns a novel method of hydrolyzing fats, fatty oils and the like saponifiable materials containing glycerides and fatty acids to produce fatty acids of improved color and stability.

Hydrolysis of fats to produce fatty acids and glycerol has been practiced commercially for many years. One of the most used and successful methods has been the Twitchell process in which the glycerides are converted into soap and glycerine by boiling the fatty oil and water with an acid catalyst, the fatty acids being recovered from the soap by acidification. This method of hydrolyzing fats with the use of an acid catalyst has largely replaced prior methods of catalytic splitting wherein the fats are autoclaved under pressure in the presence of small amounts of an alkali to split the fat and produce a resultant mixture comprising fatty acids, glycerol, and soaps.

More recently there has been put into commercial practice a new process for the continuous hydrolysis of fats by water alone, or by utilizing a small amount of a suitable catalyst, and employing a high temperature countercurrent system to split the fat into fatty acids and aqueous glycerol. Processes for splitting or hydrolyzing fats in this manner are described in more detail in the United States patents to Martin Hill Ittner 2,139,589 and Re. 22,006, and in the literature (see for example the article by Allen et al. in "Chemical Engineering Progress," vol. 43, pages 459 to 466). The present invention may be considered as a modification of such hydrolysis processes whether continuous or otherwise.

One of the main objections to acid hydrolysis is that in many cases the fatty acids which are produced are quite dark in color. Various methods have been proposed heretofore for improving the quality of the acids, such as deaeration of the fatty oil and water feed stocks, and carrying out the acid-splitting reaction in the presence of decolorizing agents such as fullers earth, charcoal, and the like to obtain lighter-colored fatty acids. While deaeration of the materials to be treated is of value, it is not a satisfactory solution of the discoloration problem because of the difficulty in removing all the air and occluded oxygen supplying substances. Moreover, it is expensive and adds considerably to the cost of the finished product. The use of decolorizing agents also have been helpful to some extent in improving the color of the fatty acids produced, however, the prevention of such discoloration effects initially is considered of more importance. This is achieved utilizing the present invention and without requiring additional equipment or the use of expensive operations.

The discoloration is believed to be due principally to the presence of highly unsaturated fatty compounds in the fatty oil or fatty material which are readily oxidized, or function in some manner to catalyze a chemical reaction with any oxygen present to produce color bodies, or by-product carbonyl compounds, which tend to form a product having an undesirable color. Such discoloration effects are accelerated during the fat-splitting operation due to exposure of the fatty material to oxidation at relatively high temperatures and under conditions conducive to oxidation or related chemical reactions resulting in the production of color bodies.

According to the present invention, by carrying out the hydrolysis of the fat, or fatty material, in the presence of a relatively small amount of a substance or substances having antioxidant and catalytic properties, the production of color bodies during hydrolysis is prevented, or greatly lessened, whereby fatty acids and glycerine of improved stability and color are obtained. Substances employed for this purpose may be termed "stabilizing catalysts" inasmuch as they perform the dual function of stabilizing the fatty material and fatty acids against detrimental oxidative influences, and acting catalytically to promote the rapid splitting of the fatty material into fatty acids and aqueous glycerol.

The stabilizing catalytic substances are compounds having antioxidant as well as catalytic properties and which are soluble in aqueous fatty material so that the required amount can be incorporated without adversely affecting the physical or chemical properties of the fatty acid or glycerine product. Substances which have been found useful as stabilizing catalysts are hydroxy benzene derivative compounds and the like having one or more alkyl or alkoxy groups or chains attached to the benzene ring. Tin oxide and its salts may also be used. Examples of suitable hydroxy aromatic compounds which may be used are isopropyl ortho cresol, normal propyl ortho cresol, mono butyl meta cresol, 4-6 tertiary butyl meta cresol, 2-6 ditertiary butyl para cresol, diamyl phenol, 3-methyl-6-isopropyl phenol, 1-hydroxy-2-methoxy-benzene, and the like phenolic derivative compounds. Where the use of a relatively non-toxic stabilizing catalyst is desired, other hydroxy aromatic compounds such as N. D. G. A. (nordihydroguaiaretic acid) may be utilized. The various compounds may be employed alone or in combination. Further, to enhance the stabilizing properties of these organic compounds and increase their effectiveness the addition of a trace of other substances having a synergistic effect may be made. For example, to such stabilizing catalysts there may be incorporated 0.002% by weight of citric or phosphoric acid to produce this desired effect. The amount of stabilizing catalyst incorporated in the fat or fatty oil being treated will vary depending upon the fatty material being treated and relative effectiveness of the stabilizing catalyst employed. In general, the amount used ranges from about 0.01% to 5% by weight of the fat or fatty oil being treated. Usually not over about 2% is employed, and ordinarily the final fatty acid product should contain not more than 1% of the stabilizing agent and preferably about 0.5% or less.

While the exact nature of the action of the stabilizing catalyst added is not understood at the present time, it is believed that the relatively high molecular weight hydroxy benzene derivative compounds, which have antioxidant properties and no appreciable tendency to cause discolorations, preferentially react with the olefinic or polyolefinic substances normally present in the fat or formed during the fat splitting process and prevent them from catalyzing or otherwise functioning to cause discoloration and chemical instability of the fatty acid material. With the use of tin oxide or tin salts, for example tin stearate as the stabilizing catalyst, the presence or formation of tin soap or tin carbonyl compounds may account for the beneficial effects produced. Substances, however, which otherwise may be suitable may not be usable where they react with the fatty material or fatty acids formed to produce undesirable discolorations or color bodies.

In accordance with the preferred practice of utilizing the invention, the stabilizing catalyst is added to the fat or fatty material prior to preheating the same and subjecting it to hydrolysis to form fatty acids and aqueous glycerol. An alternative practice is to introduce the stabilizing catalyst with the water. Preferably the hydrolysis is carried out in a continuous countercurrent system using sufficient stabilizing catalyst to protect the fatty material and subsequent fatty acids formed by hydrolysis against oxidation while at the same time catalyzing the reaction. The invention, however, may be employed with equally good results where the hydrolysis is carried in an intermittent, semi-continuous manner, or as a batch operation. Where insufficient amounts of the stabilizing catalyst is retained by the fatty acids after the fat-splitting reaction to stabilize and inhibit oxidation of the fatty acids during subsequent distillation, purification and saponification as a batch or continuous process, additional amounts of the stabilizing catalyst may be incorporated in the freshly split fatty acids, or at any stage or stages of the process.

The color of the fats and fatty material used in making soap is known to directly influence the appearance and stability of the finished product, and it has been the general practice heretofore in making soaps of good color, especially floating soaps, to use fats of superior color and stability. For example, in the making of floating soaps it is generally considered that a fatty material having a color of over 2 red and 10 yellow, as read on a 5¼ inch cell Lovibond scale, cannot be used to make a finished soap of satisfactory color and stability.

Accordingly, it has been the general practice heretofore in the production of high grade soaps to use choice quality fats, otherwise prechemical bleaching of the fatty material is necessary to provide a raw material having the desired purity and color so as to insure the production of a satisfactory soap product. Use of choice fatty material, or fats requiring a bleaching or other chemical treatment prior to splitting and saponification of the fatty acid material, substantially increases the cost of the finished product which, of course, is undesirable. The process of the present invention overcomes or greatly lessens this costly requirement by making it possible to utilize low grade fats of poor color and stability in the production of soaps having good color and excellent keeping qualities, and such as heretofore have been obtained only by using higher grade and more expensive fatty materials.

The following examples show how the invention may be utilized, it being understood that the same are merely illustrative and not limitative of the invention.

*Example I*

In a continuous hydrolysis of the type described in the U. S. patent to Ittner 2,139,589, to a thousand pounds of common tallow (grade #4) there is added 5 pounds of isopropyl-ortho cresol, the cresol being dissolved in a portion of the tallow forming a suitable concentrate which is then stirred into the remaining body of tallow. The resultant tallow material containing the stabilizing catalyst is then heated to 482° F. and hydrolyzed with water at the same temperature and under a pressure of 700 lbs./sq. inch gage. A tallow to $H_2O$ ratio of 1.4 is used and the flow rate of tallow is maintained at 50 lbs./hr., the tallow and water being held in contact, as by flowing the same countercurrently through a vertically arranged tower, for approximately three and a half hours.

*Example II*

To a thousand pounds of coconut oil there is incorporated 6 pounds of 4,6 ditertiary butyl meta cresol similarly as in Example I. The coconut oil-cresol mixture is then subjected to hydrolysis with water at a temperature of 482° F. and pressure of 700 lbs./sq. inch. In this instance the oil to $H_2O$ ratio was 1.6 while flow rate and time of contact of oil and water remained the same as in Example I.

*Example III*

To a thousand pounds of a fatty mixture comprising 70% tallow and 30% coconut oil there is incorporated 8 pounds of diamyl phenol containing 0.002% by weight of citric acid. The fatty oil mixture containing the stabilizing catalyst is heated and subjected to hydrolysis with water at a temperature of 464° F. and under a pressure of 700 lbs./sq. inch gage. An oil/$H_2O$ ratio of 1.6 is employed and the flow rate and contact time is held the same as set out in Example I to bring about splitting of the fatty material into fatty acids and aqueous glycerol.

*Example IV*

Hydrolysis of a quantity of tallow is carried out as described in Example I using tin oxide (0.2% by weight of the tallow) as the stabilizing catalyst instead of the cresol derivative compound.

Example V

To a tallow-coconut oil mixture as described in Example III is incorporated 0.1% by weight of nordihydroguaiaretic acid containing 0.002% by weight phosphoric acid as the stabilizing catalyst.

Example VI

To a batch of coconut oil to be hydrolyzed into fatty acids and aqueous glycerol there is incorporated 0.1% by weight of tin stearate as a stabilizing catalyst. The fatty oil containing the tin stearate is then subjected to hydrolysis with water in an autoclave while heated to 490° F. and at a pressure of 650 pounds per square inch.

Example VII

To a coconut oil-tallow mixture as set out in Example III there is incorporated 0.1% by weight 1-hydroxy-2-methoxy benzene as the stabilizing catalyst and the hydrolysis carried out as described in Example I.

The fat-splitting process of the present invention may be practiced without employing additional catalytic agents but in certain instances where it is desired to influence the rate of splitting or temperatures employed during hydrolysis, small amounts of other substances may be present or added i. e. calcium or magnesium oxide, zinc oxide, sodium hydroxide, or the like. The use of other synergistic acting substances, such as ascorbic acid may be used in place or phosphoric or citric acid, particularly with nordihydroguaiaretic acid and the like hydroxy aromatic antioxidant compounds.

What is claimed is:

1. A process of hydrolyzing fatty material to produce fatty acids and glycerine which comprises intimately contacting said fatty material with water by countercurrent flow at high temperatures and at superatmospheric pressures in the presence of a stabilizing catalyst having antioxidant and catalytic properties to avoid substantial darkening of the fatty acids and glycerine produced, said stabilizing catalyst consisting of an hydroxy aromatic derivative compound having at least one alkyl group attached to a single benzene nucleus.

2. The process as set out in claim 1 wherein the stabilizing catalyst is isopropyl ortho cresol.

3. The process as set out in claim 1 wherein the stabilizing catalyst is normal propyl ortho cresol.

4. The process as set out in claim 1 wherein the stabilizing catalyst is mono butyl meta cresol.

5. The process as set out in claim 1 wherein the stabilizing catalyst is 4-6 tertiary butyl meta cresol.

6. The process as set out in claim 1 wherein the stabilizing catalyst is 2-6 ditertiary butyl para cresol.

7. A process of hydrolyzing fatty material without substantial darkening of the fatty acids and glycerine produced which comprises incorporating a stabilizing catalyst having antioxidant and catalytic properties into said fatty material, and intimately contacting said fatty material and stabilizing catalyst with water by countercurrent flow at high temperatures and superatmospheric pressures, said stabilizing catalyst consisting of an hydroxy benzene derivative compound having at least one alkyl group attached to a single benzene nucleus.

8. In the process of producing fatty acids from fatty material by continuous hydrolysis which comprises intimately contacting said fatty material with water by countercurrent flow at high temperature and at superatmospheric pressures and the recovery and purification of the fatty acid product by distillation, the improvement which consists in carrying out the hydrolysis and distillation steps of the process in the presence of a stabilizing catalyst having antioxidant and catalytic properties to avoid substantial darkening of the fatty acids produced, said stabilizing catalyst consisting of an hydroxy benzene derivative compound having at least one alkyl group attached to a single benzene nucleus.

JOHN ROSS.
WALTER RUSSELL TRENT.

REFERENCES CITED

The following references are of record in the file of this patent:

UNITED STATES PATENTS

| Number | Name | Date |
| --- | --- | --- |
| 1,884,559 | Calcott | Oct. 25, 1932 |
| 2,107,069 | Evans | Feb. 1, 1938 |
| 2,373,192 | Lauer | Apr. 10, 1945 |
| 2,374,234 | Phelps et al. | Apr. 24, 1945 |
| 2,416,074 | Weber et al. | Feb. 18, 1947 |
| 2,440,383 | Riemenschneider et al. | Apr. 27, 1948 |
| 2,444,307 | Penn | June 29, 1948 |
| 2,451,748 | Kraybill et al. | Oct. 19, 1948 |
| 2,494,114 | Black | Jan. 10, 1950 |

OTHER REFERENCES

A. W. Ralston, "Fatty Acids and Their Derivatives," published January 1948 by R. Wiley & Sons, New York, N. Y., pages 267, 270, 271, 417 and 418.

S. B. Elliott, "The Alkaline-Earth and Heavy-Metal Soaps," published 1946 by Reinhold Publishing Corp., New York, N. Y., pages 195 and 196.